United States Patent
Furukawa

(10) Patent No.: US 10,602,450 B2
(45) Date of Patent: Mar. 24, 2020

(54) WIRELESS COMMUNICATION APPARATUS AND WIRELESS COMMUNICATION METHOD

(71) Applicant: KABUSHIKI KAISHA TOSHIBA, Tokyo (JP)

(72) Inventor: Tatsuhisa Furukawa, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 73 days.

(21) Appl. No.: 15/691,156

(22) Filed: Aug. 30, 2017

(65) Prior Publication Data
US 2018/0270759 A1    Sep. 20, 2018

(30) Foreign Application Priority Data
Mar. 17, 2017 (JP) .................. 2017-053613

(51) Int. Cl.
*H04W 4/00* (2018.01)
*H04W 52/02* (2009.01)
(Continued)

(52) U.S. Cl.
CPC ......... *H04W 52/0238* (2013.01); *H04W 4/21* (2018.02); *H04W 4/80* (2018.02); *H04W 72/0406* (2013.01); *H04W 72/082* (2013.01); *Y02D 70/00* (2018.01); *Y02D 70/10* (2018.01); *Y02D 70/14* (2018.01); *Y02D 70/142* (2018.01); *Y02D 70/144* (2018.01)

(58) Field of Classification Search
CPC ..... H04W 52/0238; H04W 4/21; H04W 4/80; H04W 72/082; H04W 72/0406
USPC ................ 370/311, 328–338; 340/7.32–7.38
See application file for complete search history.

(56) References Cited

U.S. PATENT DOCUMENTS 7,006,451 B2 * 2/2006 Kuwahara .............. H04B 1/715
                                                        370/252
7,283,789 B2 * 10/2007 Choi ...................... H04B 1/715
                                                        370/437
(Continued)

FOREIGN PATENT DOCUMENTS

JP    H03295325 A    12/1991
JP    2002198867 A    7/2002
(Continued)

OTHER PUBLICATIONS

Japanese Office Action dated Jul. 9, 2019, mailed in counterpart Japanese Application No. 2017-053613, 4 pages (with translation).

*Primary Examiner* — Thai D Hoang
(74) *Attorney, Agent, or Firm* — Kim & Stewart LLP

(57) ABSTRACT

A wireless communication apparatus includes a transmission unit to transmit a communication control signal on each wireless communication channel in a plurality of wireless communication channels and an interference detection unit to detect interference on each wireless communication channel in the plurality of the wireless communication channels. A control unit controls the transmission unit to stop transmitting the communication control signal on any wireless communication channel in the plurality of wireless communications on which interference is detected by the interference detection unit.

16 Claims, 6 Drawing Sheets

(51) Int. Cl.
    *H04W 72/08*     (2009.01)
    *H04W 72/04*     (2009.01)
    *H04W 4/21*      (2018.01)
    *H04W 4/80*      (2018.01)

(56) References Cited

U.S. PATENT DOCUMENTS

| | | |
|---|---|---|
| 9,491,787 B2 | 11/2016 | Takahashi et al. |
| 2005/0247784 A1 | 11/2005 | Klatt |
| 2008/0069275 A1* | 3/2008 | Horiguchi ............... H04B 7/10 375/347 |
| 2010/0085161 A1* | 4/2010 | Nishikawa ........... G06K 7/0008 340/10.3 |
| 2012/0170635 A1* | 7/2012 | Peroulas ............. H04L 25/0212 375/227 |
| 2013/0324117 A1* | 12/2013 | Kim ...................... H04L 1/0047 455/434 |
| 2014/0376496 A1* | 12/2014 | Kozaki ................. H04W 40/16 370/329 |
| 2015/0009965 A1* | 1/2015 | Maiya ............... H04W 72/0446 370/336 |
| 2015/0163806 A1* | 6/2015 | Kobayashi ............ H04W 16/14 370/329 |
| 2015/0271825 A1 | 9/2015 | Takahashi et al. |
| 2017/0118699 A1* | 4/2017 | Law ..................... H04W 48/16 |

FOREIGN PATENT DOCUMENTS

| | | |
|---|---|---|
| JP | 2005529431 A | 9/2005 |
| JP | 2005323032 A | 11/2005 |
| JP | 2015119215 A | 6/2015 |
| JP | 2015179924 A | 10/2015 |

\* cited by examiner

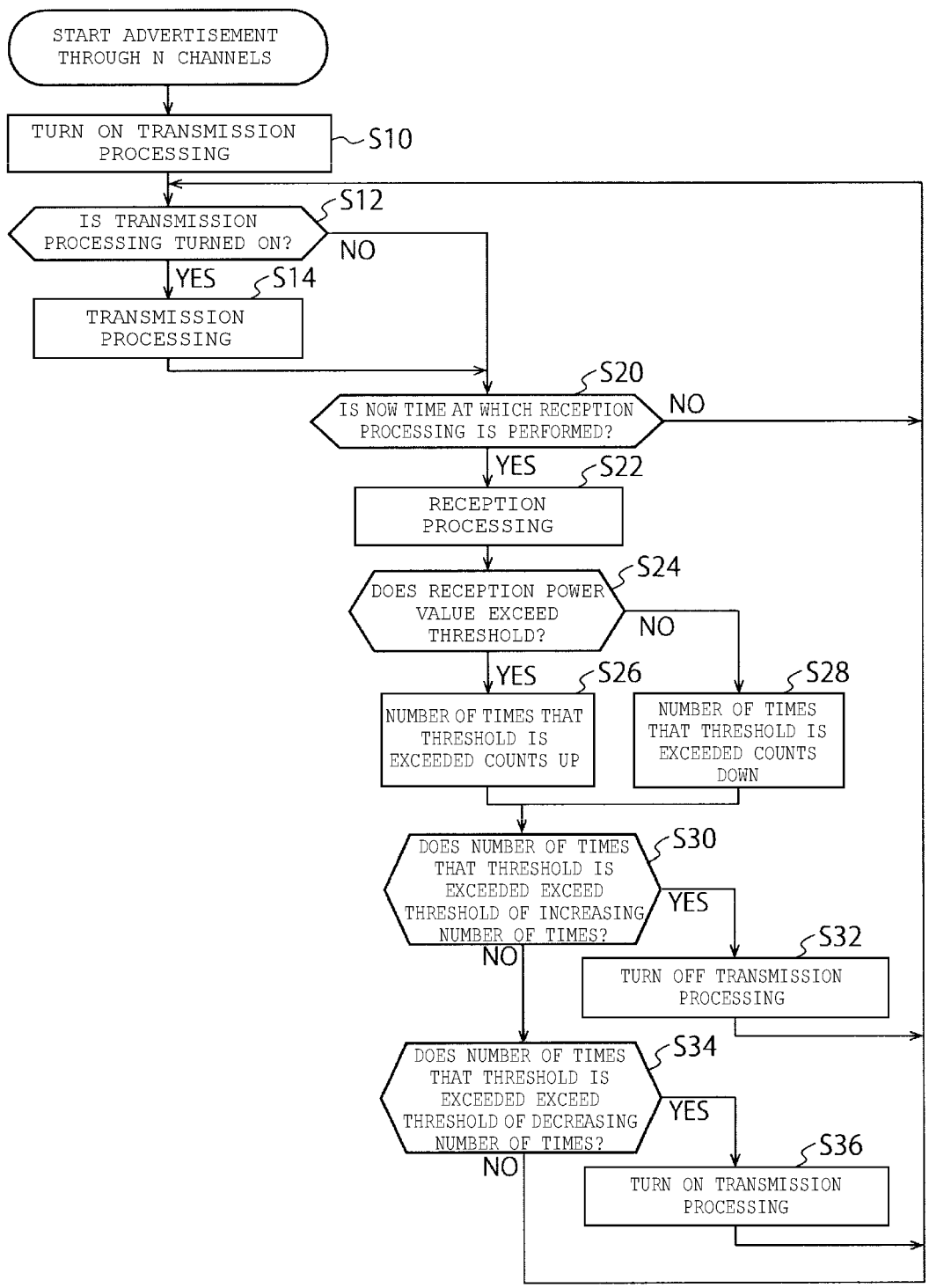

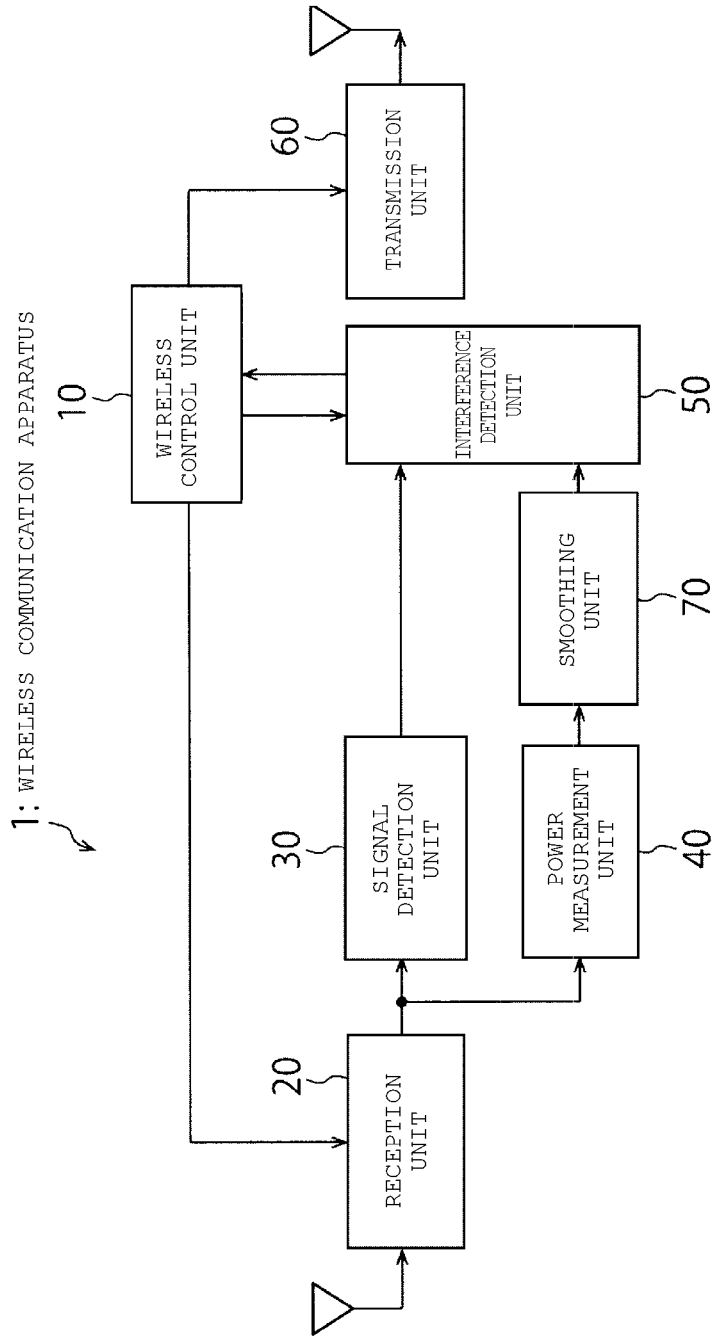

WIRELESS COMMUNICATION APPARATUS AND WIRELESS COMMUNICATION METHOD

This application is based upon and claims the benefit of priority from Japanese Patent Application No. 2017-053613, filed Mar. 17, 2017, the entire contents of which are incorporated herein by reference.

FIELD

Embodiments described herein relate generally to a wireless communication apparatus and a wireless communication method.

BACKGROUND

Various communication specifications are used for wireless communication, but in recent years, wireless communication apparatuses that comply with Bluetooth® low energy (BLE) specifications have come into widespread use. In the BLE specifications, when a slave apparatus intends to establish a connection with a master apparatus, the slave apparatus first transmits a signal that is referred to as an advertisement signal, which is a type of communication control signal, and the master apparatus recognizes the slave apparatus is present by receiving the advertisement signal. Thereafter, the master apparatus, now aware of the presence of the slave apparatus, transmits a connection request signal to the slave apparatus that makes it possible to establish a connection and perform data transmission and reception between the master apparatus and the slave apparatus.

In the BLE specifications, an ISM band of 2.4 GHz is used. There are 40 wireless channels in this 2.4 GHz ISM band, and, from among the 40 channels, three channels are used for the transmission of the advertisement signal.

Because the advertisement signal is intermittently transmitted by the slave apparatus until a connection with a master apparatus is established, a reduction in power consumption for the transmission of this advertisement signal makes it possible for a slave-side battery, to operate for a longer time.

To cope with this power consumption problem in some devices, measures may be taken to perform advertisement signal transmission using only a channel through which a connection can be established and thus to reduce power consumption by not transmitting advertisement signals over the other two channels.

However, the 2.4 GHz ISM band is also used by various apparatuses, such as a wireless LAN, a microwave oven, and, more generally, other industrial, scientific, and medical apparatuses. Depending on a situation of the occupation of the advertisement channel by any of these other apparatuses, the fact that a connection was once previously established in the past without interference does not guarantee that another connection can be established over the same channel at some later point in time since interference(s) may come and go. Furthermore, the time required for the connection to be established using only one specific channel may be lengthened considerably, and this also results in excessive power consumption.

DESCRIPTION OF THE DRAWINGS

FIG. 7 is a flowchart for describing aspects of advertisement processing that are performed by a wireless communication apparatus according to a second embodiment.

FIG. 8 is a block diagram depicting a modification of the wireless communication apparatuses according to the first embodiment and the second embodiment.

DETAILED DESCRIPTION

In general, according to one embodiment, a wireless communication apparatus includes a transmission unit configured to transmit a communication control signal on each wireless communication channel in a plurality of wireless communication channels and an interference detection unit configured to detect interference on each wireless communication channel in the plurality of the wireless communication channels. A control unit controls the transmission unit to stop transmitting the communication control signal on any wireless communication channel in the plurality of wireless communications on which interference is detected by the interference detection unit.

In generation, according to another embodiment, there is provided a wireless communication method including: causing a transmission unit to transmit a communication control signal on a plurality of wireless channels; detecting interference in wireless communication on the plurality of wireless channels; and controlling the transmission unit such that the communication control signal is not transmitted on any wireless channel in the plurality of wireless channels on interference has been detected.

A wireless communication apparatus according to example embodiments will be described below with reference to the drawings. In the following description, elements that have substantially the same function and configuration are given the same numeral reference, and repetitive descriptions may be omitted.

First Embodiment

A wireless communication apparatus according to a first embodiment checks each of a plurality of advertisement channels for the presence of interference, and causes an advertisement signal not to be transmitted on at least one advertisement channel on which the interference has been detected, thereby preventing unnecessary transmission from being performed and achieving reduction in power consumption.

Figure 1:
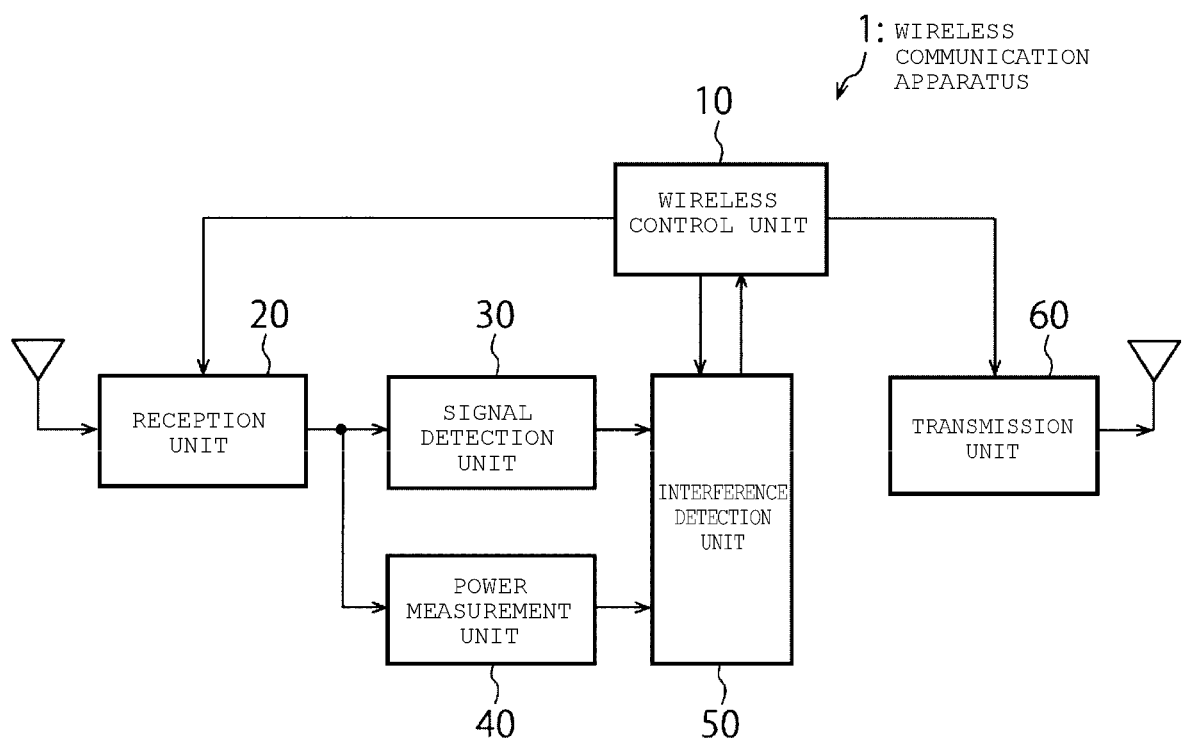
FIG. 1 is a block diagram depicting aspects of a wireless communication apparatus according to a first embodiment or a second embodiment.

FIG. 1 is a block diagram for describing an overall configuration of a wireless communication apparatus 1 according to the first embodiment. In the first embodiment, the technical description is provided on the assumption that a wireless control unit 10 complies with Bluetooth low energy (BLE) specifications, but the application of the present disclosure is not limited to devices operating according to any BLE specifications.

As illustrated in FIG. 1, the wireless communication apparatus 1 includes the wireless control unit 10, a reception unit 20, a signal detection unit 30, a power measurement unit 40, an interference detection unit 50, and a transmission unit 60. In the first embodiment, the wireless communication apparatus 1 constitutes a slave apparatus in compliance with the BLE specifications.

The wireless control unit 10 is a controller that performs general control of the wireless communication apparatus 1. In the first embodiment, the reception unit 20 and the transmission unit 60 control which wireless channel is used to perform wireless communication based on interference channel information that is output from the interference detection unit 50. Furthermore, the wireless control unit 10 outputs channel control information for specifying a wireless channel that is currently in use to the interference detection unit 50.

The reception unit 20 is a receiver that converts a signal in a radio frequency (RF) band, which is received from an antenna, into a baseband signal. For example, the signal in the RF band is converted into a signal in an intermediate frequency (IF) band. Then, an analog-to-digital (AD) converter converts the resulting signal in the IF band from an analog signal into a digital signal. Then, the resulting digital signal is converted into a baseband signal.

The signal detection unit 30 detects a preamble signal or an access address signal that is a type of identification signal in the BLE signal, or other signals, from the baseband signal that is output from the reception unit 20, and thus detects the presence and absence of the BLE signal and outputs a result of the detection to the interference detection unit 50.

The power measurement unit 40 measures a signal power of the base signal that is output from the reception unit 20. The measured power value of the base signal is output to the interference detection unit 50.

Based on the channel control information from the wireless control unit 10, the interference detection unit 50 detects interference on every channel. For example, the signal detection unit 30 may determine that an identification signal in the BLE signal cannot be detected. In a case where the power value (output from the power measurement unit 40) is a predetermined power value or greater, the interference detection unit 50 determines that interference is occurring in the wireless channel. The determination of an interference state, along with a channel control signal, is output to the wireless control unit 10.

It is noted that the power measurement unit 40 here is a device that acquires a plurality of different power values at one measurement point over time, calculates the average of the plurality of different power values, and can output the resulting average, as a signal power value, to the interference detection unit 50. Accordingly, in a case, such as when a power value increases due to transient noise in a wireless channel, it is possible to suppress the interference detection unit 50 from making false detection of interference based on such temporary noise.

Furthermore, based on the power value that is measured in the power measurement unit 40, the interference detection unit 50 may determine whether or not whether the interference occurs regardless of whether or not the signal detection unit 30 detects an identification signal. In this case, there is no need to drive the signal detection unit 30, and power consumption can be accordingly reduced. For example, in a case where the transmission unit 60 does not transmit the advertisement signal because it is assumed the master apparatus will not reply with a response to the advertisement signal, then the interference may be detected based on only the power value that is measured by the power measurement unit 40.

Based on the interference state determination that is output from the interference detection unit 50, the wireless control unit 10 determines whether or not an advertisement signal should be transmitted using any particular advertisement channel. In a case where the advertisement signal is transmitted in succession using same advertisement channel, the wireless control unit 10 outputs a transmission control signal in an ON state to the transmission unit 60. Conversely, in a case where the transmission of the advertisement signal is stopped on an advertisement channel, the wireless control unit 10 outputs the transmission control signal in an OFF state to the transmission unit 60.

In a case where the transmission control signal that is output from the wireless control unit 10 is in the ON state for a particular advertisement channel, the transmission unit 60 converts the baseband signal in the corresponding advertisement channel, and transmits the resulting signal in the RF band from an antenna. On the other hand, in a case where the transmission control signal that is output from the wireless control unit 10 is in the OFF state for a particular advertisement channel, the baseband signal in the corresponding advertisement channel is not converted into the signal in the RF band and thus there is no corresponding signal in the RF band to be transmitted from the antenna.

Figure 2:
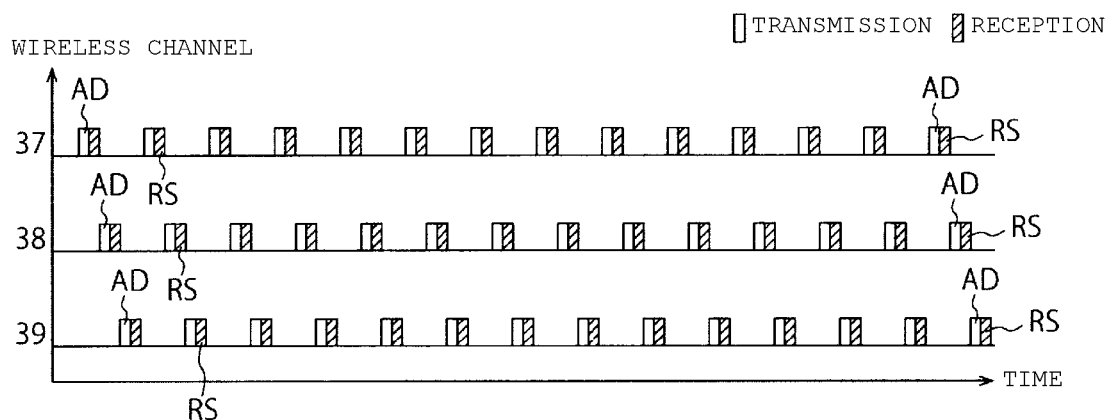
FIG. 2 is a diagram for describing aspects of transmission of an advertisement signal in a wireless apparatus according to the first embodiment in a state where interference is not present.

FIG. 2 is a diagram for describing an aspect in which the wireless communication apparatus 1 according to the first embodiment transmits the advertisement signal that is to be transmitted, and illustrates a state where the interference in the wireless communication does not occur in the advertisement channel. As depicted in FIG. 2, the three advertisement channels are the three wireless channels 37 ch, 38 ch, and 39 ch. However, the number of advertisement channels is arbitrary, and it is sufficient for a plurality of advertisement channels to be present, for example, five or seven wireless channels.

In FIG. 2, the vertical axis represents channel numbers of the advertisement channels, and the horizontal axis represents time. In each of the advertisement channels, the wireless communication apparatus 1 that is the slave apparatus performs an advertisement signal transmission operation AD with a predetermined periodicity, and transmits the advertisement signal to the master apparatus. Then, a response signal reception operation RS is performed immediately after the advertisement signal has been transmitted to detect presence or absence of a response to the advertisement signal from the master apparatus. For this reason, in the wireless communication apparatus 1, at the timing at which the reception unit 20 receives, or is expected to receive, the response signal, the interference detection unit 50 performs a detection of the interference in the wireless communication.

Figure 3:
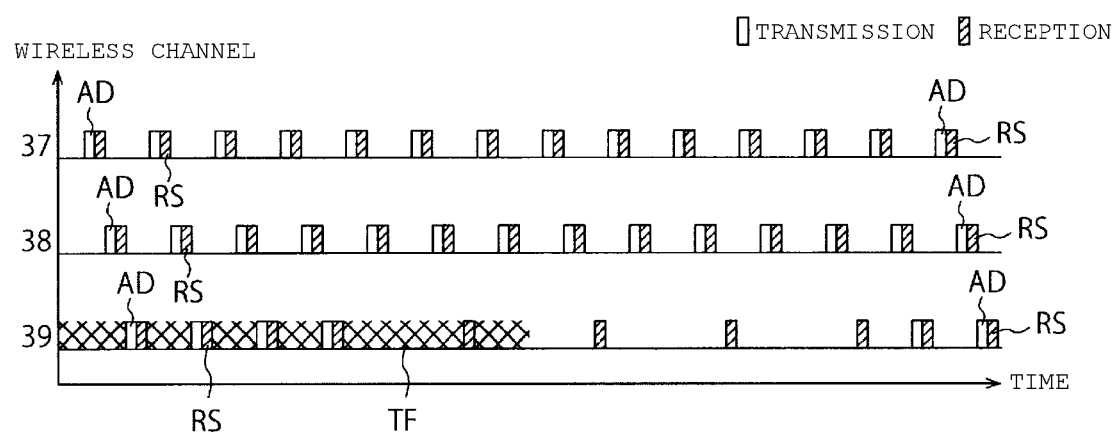
FIG. 3 is a diagram for describing aspects of a transmission of the advertisement signal in a wireless apparatus according to the first embodiment in a state where interference occurs temporarily.

FIG. 3, like FIG. 2, is a diagram for describing the aspect in which the wireless communication apparatus 1 according to the first embodiment transmits an advertisement signal, but FIG. 3 is different from FIG. 2 in that FIG. 3 illustrates a state where interference in wireless communication occurs in the advertisement channel 39 ch. As understood from FIG. 3, in a case where interference TF in the wireless communication is detected in the advertisement channel 39 ch the wireless communication apparatus 1 according to the first embodiment stops sending the advertisement signal through the advertisement channel 39 ch. That is, the advertisement signal transmission operation AD for 39 ch is temporarily stopped. However, the advertisement signal transmission operation AD is continued for the advertisement channels 37 ch and 38 ch.

Then, the wireless communication apparatus 1 continues to detect in succession the presence/absence of the interference in the advertisement channel 39 ch, and when it is determined that the interference is no longer being detected, resumes the advertisement signal transmission operation AD for transmitting the advertisement signal for advertisement channel 39 ch. In order to determine the presence/absence of interference, the wireless communication apparatus 1 still has to perform reception processing (RS) on the advertisement channel 39 ch, though without transmitting the advertisement signal (AD) on this channel. But as depicted FIG. 3, a time interval at which reception processing (RS) is performed after the interference has been detected may be lengthened relative to a time interval at the reception processing (RS) is performed before the interference is detected so as to reduce the overall power consumption required for reception processing in the wireless communication apparatus 1. However, the time interval at which the reception processing (RS) is performed after the interference is detected may also remain the same as the time interval of the reception processing (RS) that is performed before the interference is detected.

Figure 4:
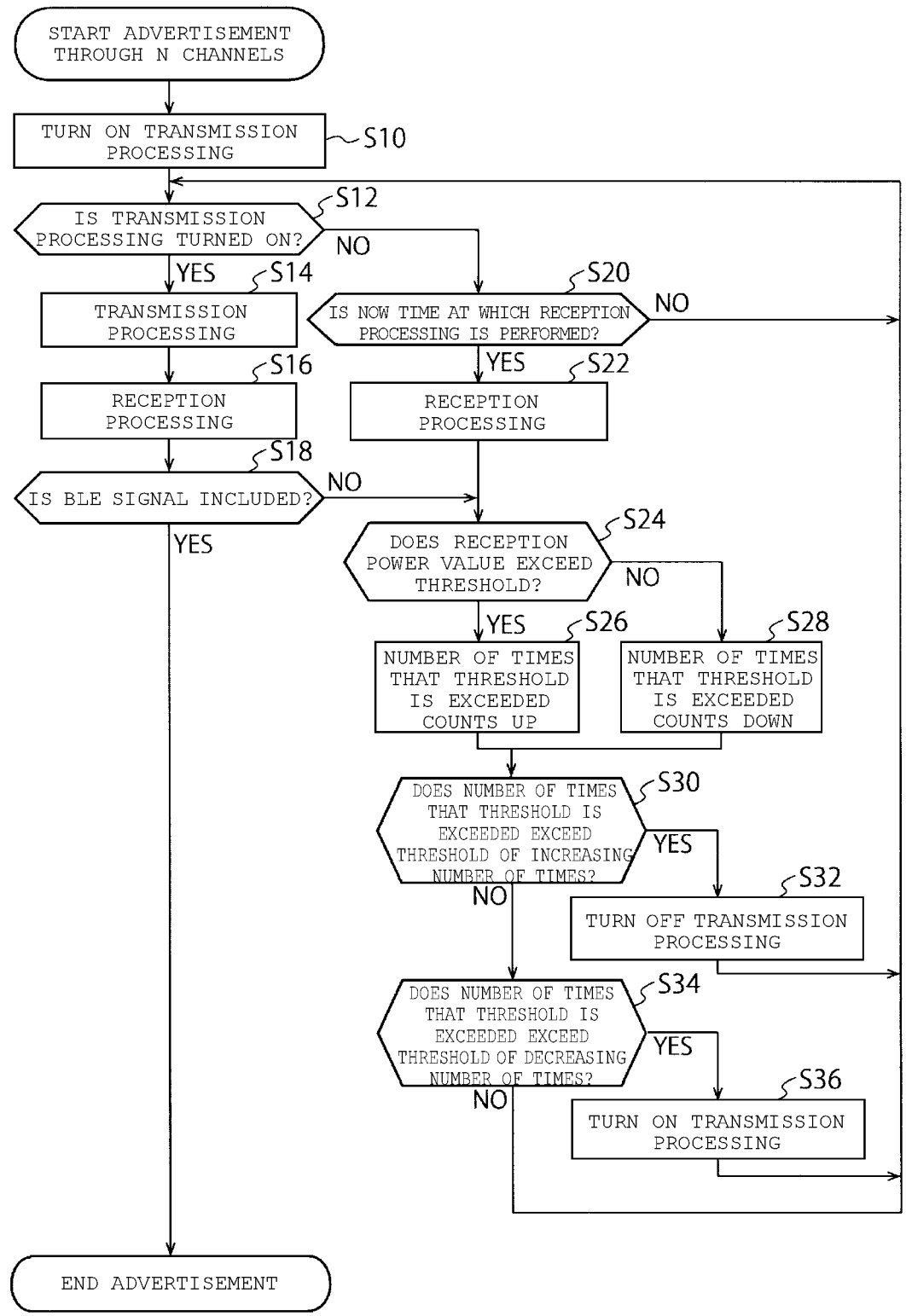
FIG. 4 is a flowchart for describing aspects of advertisement processing that are performed by the wireless communication apparatus according to the first embodiment.

FIG. 4 is a diagram illustrating a flowchart for describing advertisement processing that is performed in the wireless communication apparatus 1 according to the first embodiment. In the first embodiment, for example, the advertisement processing is processing that is performed under the control of the wireless control unit 10. Furthermore, the advertisement processing is processing that is performed for each of the plurality of advertisement channels that are being used, and in the present embodiment, as described above, is performed individually on each of the three advertisement channels 37 ch, 38 ch, and 39 ch. In other words, in a case where N advertisement channels are being used or are otherwise available, the advertisement processing is performed N times in parallel.

As illustrated in FIG. 4, the wireless communication apparatus 1 turns on transmission processing of the advertisement signal (Step S10). Next, the wireless communication apparatus 1 determines whether or not the transmission processing is still turned on for a particular channel (Step S12). In a case where the transmission processing is still turned on (Yes in Step S12), the wireless communication apparatus 1 performs the transmission processing of the advertisement signal (Step S14). Specifically, the wireless control unit 10 instructs the transmission unit 60 to transmit the advertisement signal using the corresponding advertisement channel.

Next, the wireless communication apparatus 1 performs the reception processing for receiving the response to the advertisement signal from the master apparatus (Step S16). Specifically, the wireless control unit 10 instructs the reception unit 20 to perform the reception on the corresponding advertisement channel. Subsequently, the wireless communication apparatus 1 determines whether or not an identification signal, such as a BLE signal, is in the received signal (Step S18). Specifically, the wireless control unit 10 causes the signal detection unit 30 to detect whether or not the identification signal is included in the received signal. In a case where the identification signal is included in the received signal (Yes in Step S18), the advertisement processing is ended because the response to the advertisement signal has been received from the master apparatus.

On the other hand, in a case where it is determined in Step S12 that the transmission processing is not turned on, more precisely, the transmission processing is turned off for a particular channel (No in Step S12), the wireless control unit 10 of wireless communication apparatus 1 determines whether or not now is the time at which the reception processing is to be performed (Step S20). In a case where now is the time at which the reception processing is to be performed (No in Step S20), the wireless communication apparatus 1 returns to Step S12 described above. Accordingly, in a case where the transmission processing is powered off and the advertisement signal is not transmitted, the frequency with which the reception processing is performed can be reduced. It is arbitrary to determine how many times the transmission processing has to be powered off before the reception processing is performed one time. For example, various settings are possible such as a setting in which the transmission processing has to be powered off three times or five times before the reception procession is performed one time.

In Step S20, in a case where now is the time at which the reception processing is to be performed (Yes in Step S20), the wireless communication apparatus 1 performs the reception processing in the wireless communication on the corresponding advertisement channel (Step S22). Specifically, the wireless control unit 10 instructs the reception unit 20 to perform the reception on the corresponding advertisement channel. At this time, the wireless control unit 10 needs to activate the power measurement unit 40 to measure a power value of the received signal, but does not necessarily need to activate signal detection unit 30. Since the advertisement signal was not transmitted, we assume that an identification signal responding to advertisement signal will not be received.

In a case where the reception processing in Step S22 is finished, or in a case where it is determined in Step S18 described above that the identification signal (e.g., a BLE signal) is not included in the reception signal (No in Step S18), the wireless communication apparatus 1 determines whether or not the power value of the reception signal exceeds a threshold (Step S24). Specifically, the wireless control unit 10 causes the interference detection unit 50 to determine whether or not the power value that is output from the power measurement unit 40 exceeds a predetermined threshold.

In a case where it is determined that the power value of the reception signal exceeds the threshold (Yes in Step S24), the wireless control unit 10 causes a counter for tracking the number of times that the threshold has been exceeded to increase by one (Step S26). On the other hand, if it is determined that the power value of the reception signal does not exceed the threshold (No in Step S24), the wireless control unit 10 causes the counter to decrease by one (Step S28).

After Step S26 or S28, the wireless control unit 10 determines whether or not a value of the counter value exceeds some threshold of the increasing number of times (Step S30). In a case where the value of the counter exceeds the threshold of the increasing number of times (Yes in Step S30), the wireless control unit 10 turns off the transmission processing (Step S32) and repeats Step S12 and subsequent steps, which are described above. That is, it is determined that the interference is detected in the advertisement channel, and the advertisement signal is made not to be transmitted from the advertisement channel.

On the other hand, in a case where it is determined in Step S30 that the value of the counter does not exceed the threshold of the increasing number of times (No in Step S30), it is determined whether not the value of the counter falls below a threshold for the decreasing number of times (Step S34). In a case where it is determined that the value of the counter falls below the threshold for the decreasing number of times (Yes in Step S34), the transmission processing is turned on (Step S36), and repeats Step S12 and subsequent steps, which are described above. That is, once the interference is detected an initial time on the advertisement channel, but it is then subsequently determined that the interference has been canceled (e.g., when the counter value is below the threshold for the decreasing number of times after being above the threshold for the increasing number of times). Thus, the transmission of the advertisement signal from the corresponding advertisement channel is resumed.

On the other hand, in a case where it is determined in Step S34 that the value of the counter has not fallen below the threshold of the decreasing number of times (No in Step S34), the processing in Step S12 and subsequent steps are repeated without any change. That is, in a case where the value of the counter neither exceeds the threshold of the increasing number of times nor the threshold of the decreasing number of times, the processing in Step S12 and subsequent steps are repeated without the transmission process being changed. For this reason, the transmission processing remains turned off, and the transmission of the advertisement signal from the corresponding advertisement channel is not performed.

It is noted that the threshold of the increasing number of times that the advertisement processing in FIG. 4 is performed is equivalent to a first count threshold in the present embodiment, and that the threshold of the decreasing number of times that the advertisement processing in FIG. 4 is performed is equivalent to a second count threshold that is lower than the first count threshold.

Figure 5:
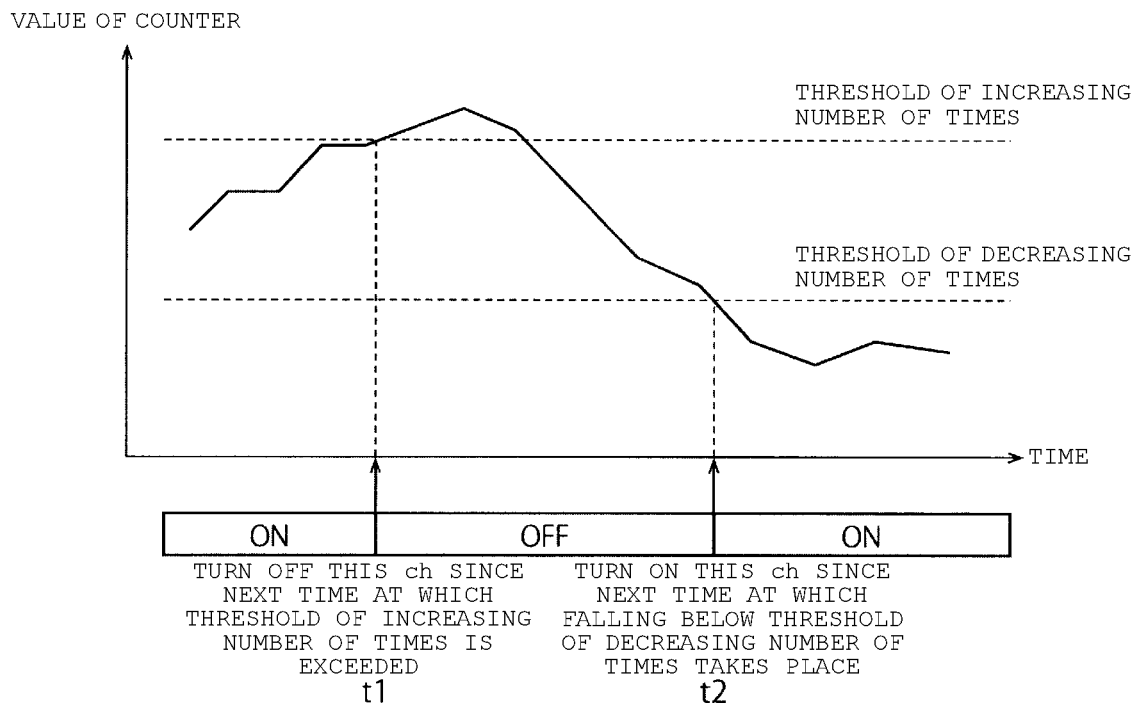
FIG. 5 is a diagram illustrating an example of a change in a value of a counter in the advertisement processing in FIG. 4.

FIG. 5 is a graph illustrating changes in the counter value in a certain advertisement channel in case where the advertisement processing in FIG. 4 is performed. In FIG. 5, the vertical axis represents values of the counter and the horizontal axis represents time. In an example in FIG. 5, at time t1, because the value of the counter exceeds the threshold of the increasing number of times, the wireless communication apparatus 1 turns off the transmission processing, and stops the advertisement signal on the corresponding advertisement channel. Thus, the power consumption is achieved.

Then, at time t2, because the value of the counter value falls below the threshold of the decreasing number of times, the wireless communication apparatus 1 turns on the transmission processing, and resumes the transmission of the advertisement signal on the advertisement channel. The threshold of the decreasing number of times is lower than the threshold of the increasing number of times, and thus, once the interference has been detected in the corresponding advertisement channel, then the transmission of the advertisement signal is made not to be performed until the environment of the wireless communication has stabilized to a certain extent. It is noted that in a case where the identification signal, such as the BLE signal, is detected in the received signal in Step S18 for the advertisement processing, the counter value resets to zero.

As described above, with the wireless communication apparatus 1 according to the first embodiment, among a plurality of advertisement channels, the advertisement signal, which is a type of communication control signal, is made to not be transmitted on an advertisement channel on which interference has been detected. For this reason, the transmission of an unnecessary advertisement signal can be avoided, and an overall reduction in power used for the transmission of advertisement signals can be achieved.

Furthermore, the transmission of the advertisement signal on a particular advertisement channel can be continued or resumed if interference on the channel is not detected. That is, after being stopped, the wireless communication apparatus 1 can again transmit the advertisement signal on the corresponding advertisement channel after interference ends. For this reason, in a case where the environment of the wireless communication is improved (e.g., less interference/noise), all the advertisement channels can be efficiently used.

Additionally, on the advertisement channel on which advertisement signal transmission has been stopped, the reception processing for determining whether or not the interference is still present can be made to be performed with less frequency than an active (ON) advertisement channel, and the power used for reception procession can be reduced as well.

Second Embodiment

According to the first embodiment described above, an advertisement signal is transmitted as a communication control signal, but according to a second embodiment, a beacon signal is transmitted as a communication control signal. The aspects of the second embodiment that are different from the first embodiment will be described below.

In general, the configuration of the wireless communication apparatus 1 according to the second embodiment is as depicted in FIG. 1. However, in this second embodiment, the transmission unit 60 transmits a beacon signal as a communication control signal at a predetermined periodicity through an advertisement channel. An apparatus that transmits a beacon signal may be referred to as a slave apparatus or may also be referred to as a beacon terminal. An apparatus that receives the transmitted beacon signal may be referred to as the master apparatus, and the configuration of such a master apparatus may be, for example, a mobile information terminal, such as a smartphone or the like. In a case where unique identification information is included in the beacon signal, where the master apparatus that receives the beacon signal which is transmitted with a predetermined periodicity specifies the identification information that is included in the beacon signal, and wherein the specified identification information and identification information of an application that is retained in the master apparatus itself are consistent with each other, an application can be executed and various pieces of information can be provided to a user of the master apparatus.

Figure 6:
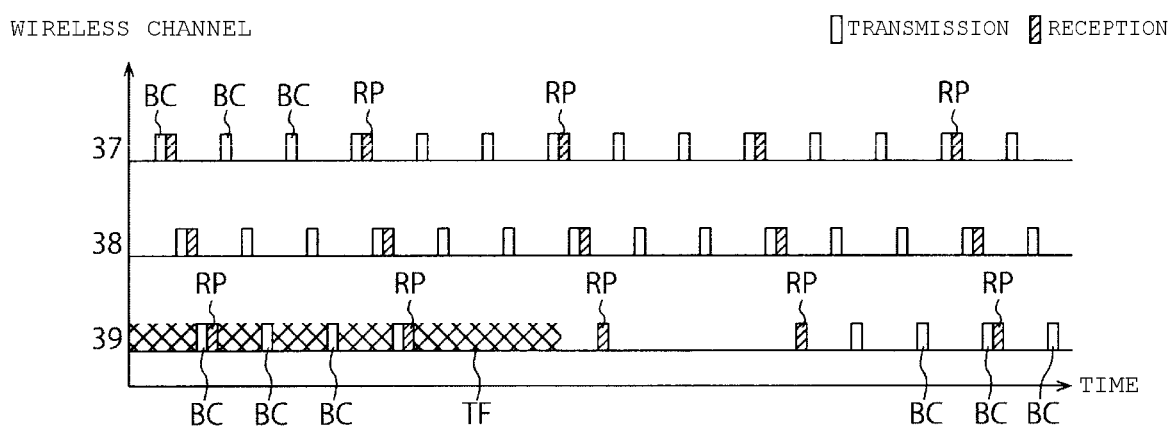
FIG. 6 is a diagram for describing aspects of a transmission of a beacon signal in a wireless apparatus according to a second embodiment in a state where interference occurs temporarily.

Similarly to FIG. 3, FIG. 6 is a diagram for describing aspects in which a beacon signal that is transmitted by a wireless communication apparatus 1 according to the second embodiment is transmitted, and illustrates a state in which, interference in the advertisement channel 39 ch occurs from among the three available advertisement channels 37 ch, 38 ch, and 39 ch.

As illustrates in FIG. 6, the wireless communication apparatus 1 performs a beacon signal transmission operation BC with a predetermined periodicity through each of the advertisement channels 37 ch, 38 ch, and 39 ch, and thus transmits the beacon signal to the master apparatus. Because the beacon signal that is transmitted by the beacon signal transmission operation BC is not, in general, a signal that requests a particular response from the master apparatus, the reception processing (RS or the like) is not normally required to be performed; however, in the second embodiment, a reception operation RP is performed at a predetermined periodicity in order to detect interference in the wireless communication on the available advertisement channels.

The reception operation RP can be performed at any arbitrary timing, but in the example depicted in FIG. 6, the reception operation RP is performed at a timing corresponding to the beacon signal transmission operation BC. In more detail, the beacon signal transmission operation BC is performed three times, the reception operation RP is performed directly after one of the three times in sequence, and the presence and absence of the interference in the signal that is received by the reception operation RP is detected. This enables the frequency with which the reception operation RP is performed to be lower than the frequency with which the beacon signal transmission operation BC is performed, because typically the environment of the wireless communication does not substantially change in a short time. Thus, a reduction in the overall power consumption used for the reception operation RP can be achieved.

In an example depicted in FIG. 6, the wireless communication apparatus 1 detects interference TF on 39 ch thus does not perform the beacon signal transmission operation BC in 39 ch for some time. However, even while the beacon signal transmission operation BC is stopped, the reception operation RP is still performed at a predetermined periodicity and it is checked whether or not interference TF is still present on 39 ch. Then, when the interference TF is no longer detected, the wireless communication apparatus 1 re-starts the beacon signal transmission operation BC on 39 ch, and thus resumes the transmission of the beacon signal on 39 ch. It is noted that on 37 ch and 38 ch, on which interference in is not detected, the beacon signal transmission operation BC for transmitting the beacon signal is continuous (e.g., no interruption in normal periodicity).

It can be said that in the wireless communication apparatus 1 according to the second embodiment, by performing the reception operation RP, the reception unit 20 and the power measurement unit 40, which are illustrated in FIG. 1 need to be activated for receiving a signal and to perform the detection of the interference based on the power value of the received signal, but that because the response to the beacon signal from the master apparatus is not expected, it is also considered that the determination of the presence and absence of the identification information is unnecessary, in which case the signal detection unit 30 does not necessarily need to be activated.

FIG. 7 is a diagram illustrating a flowchart for describing the advertisement processing that is performed in the wireless communication apparatus 1 according to the second embodiment, and is a diagram that corresponds in some aspects to FIG. 4, which is also referred to for description. In the second embodiment, the advertisement processing, for example, is also processing that is performed under the control of the wireless control unit 10. Furthermore, the advertisement processing is processing that is performed individually on each of the plurality of advertisement channels that are present or otherwise available.

When it comes to the advertisement processing depicted in FIG. 7, Step S16 for the reception processing and Step S18 in which the identification signal, such as the BLE signal, is detected are not required to be performed as depicted in the advertisement processing in FIG. 4. This is because the wireless communication apparatus 1 that receives the beacon signal does not need to receive responses to the transmitted beacon signal. However, even in a case where the transmission processing of the beacon signal is turned off in order to detect the interference in the wireless communication, the reception processing is still performed with a predetermined frequency in Step S22.

As described above, with the wireless communication apparatus 1 according to the second embodiment, as well as with the one according to the first embodiment described above, the beacon signal is a type of communication control signal that is made not to be transmitted on a channel in which interference in the wireless communication has been detected, among a plurality of possible channels. For this reason, the transmission of unnecessary beacon signals can be avoided and a reduction in the overall power necessary for the transmission of the beacon signals can be achieved.

Furthermore, even after the transmission of the beacon signal on a particular channel is stopped after detection of interference, the wireless communication apparatus 1 can resume transmission of the beacon signal again on the corresponding channel if the interference is no longer detected. For this reason, wireless communication is improved and the available channels can be efficiently used.

Additionally, the frequency with which the reception processing for determining whether or not interference in the wireless communication is present can be performed at a lower frequency than that at which the beacon signal is transmitted. For this reason, the power necessary for the reception processing can be decreased as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, as illustrated in FIG. 8, in the first embodiment and the second embodiment can be modified to incorporate a smoothing unit 70 provided between the power measurement unit 40 and the interference detection unit 50, and the power value that is output from the power measurement unit 40 may be smoothed in the smoothing unit 70, and may be input into the interference detection unit 50. This is because there are times when the power values that are measured in the power measurement unit 40 may vary widely according to the reception situation in wireless communication at the reception unit 20. Under the assumption of such a case, the power values that are input from the power measurement unit 40 are smoothed in the smoothing unit 70, it may be determined by the interference detection unit 50 whether or not this smoothed power value is equal to or higher than some predetermined power value. Accordingly, even in a case where the power values that are actually measured vary widely, the detection of the interference can be performed more stably in the interference detection unit 50.

Furthermore, in the examples described above, the interference detection unit 50 is made to perform determination of whether or not interference occurs in wireless communication using a counter that counts the number of times that the measured (or smoothed) power value of the reception signal exceeds or fall below the threshold, but the determination of whether or not the interference occurs is not limited to this. For example, in a case where the power value of the reception signal that is measured by the power measurement unit 40 falls below a predetermined threshold a predetermined number of times in succession, the interference detection unit 50 may determine that the interference in the wireless communication occurs. Furthermore, in a case where the power value of the reception signal that is measured by the power measurement unit 40 exceeds a predetermined threshold a predetermined number of times in succession, the interference detection unit 50 may determine that the interference in the wireless communication has been canceled/stopped. That is, in the case where the power value of the reception signal exceeds the predetermined threshold the predetermined number of times in succession, the transmission of the advertisement signal or the beacon signal may be stopped. Furthermore, in the case where the power value of the reception signal falls below the predetermined threshold the predetermined number of times in succession, the transmission of the advertisement signal or the beacon signal may be resumed.

In this case, the predetermined number of times in succession for determining that the interference occurs, and the predetermined number of times in succession for determining that the interference has been canceled are arbitrary, and for example, the value may possibly be set to 3, 5, 7, or other numbers. Furthermore, the predetermined number of times in succession for determining that the interference occurs, and the predetermined number of times in succession for determining that the interference has been canceled are not necessarily the same, and both may be different from each other. For example, in order to achieve a reduction in transmission power consumption, the predetermined number of times in succession for determining that the interference is canceled is made to be greater than the predetermined number of times in success for determining that the interference occurs. Then, in a case where the occurrence of the interference is detected, it is possible to carefully determine re-starting of the transmission of the advertisement signal or the beacon signal.

What is claimed is:

1. A wireless communication apparatus, comprising:
    a transmission unit configured to transmit a communication control signal on each wireless communication channel in a plurality of wireless communication channels;
    an interference detection unit configured to detect interference on each wireless communication channel in the plurality of the wireless communication channels;
    a reception unit configured to receive wireless signals on each wireless communication channel in the plurality of wireless communication channels;
    a power measurement unit configured to measure signal power values of the wireless signals received by the reception unit;
    a signal detection unit configured to detect an identification signal in reception signals received by the reception unit; and
    a control unit configured to control the transmission unit to stop transmitting the communication control signal on any wireless communication channel in the plurality of wireless communication channels on which interference is detected by the interference detection unit, wherein
    the interference detection unit detects interference according to signal power values measured by the power measurement unit,
    the interference detection unit includes a counter unit for every wireless communication channel through which the communication control signal is transmitted,
    the interference detection unit causes a counter for a wireless communication channel to increase a counter value when the signal detection unit does not detect an identification signal in a reception signal for the wireless communication channel and a power value for the reception signal exceeds a power threshold, and causes the counter to decrease the counter value when the signal detection unit does not detect the identification signal in the reception signal for the wireless communication channel and the power value for the reception signal is below the power threshold, and
    the interference detection unit determines that interference is occurring on the wireless communication channel when the counter value exceeds a first count threshold, and interference is no longer occurring on the wireless communication channel when the counter value falls below a second count threshold which is lower the first count threshold.

2. The wireless communication apparatus according to claim 1, wherein the interference detection unit is configured to continue to periodically detect interference on each wireless communication channel after interference has been detected on any wireless communication channel in the plurality of wireless communication channels.

3. The wireless communication apparatus according to claim 2, wherein the control unit is further configured to resume transmitting the communication control signal on any wireless communication channel for which interference is no longer detected by the interference detection unit.

4. The wireless communication apparatus according to claim 1, wherein the interference detection unit is configured to reset the counter when the signal detection unit detects the identification signal in the reception signal.

5. The wireless communication apparatus according to claim 1, wherein
    the interference detection unit is configured to determine that interference occurs on a wireless communication channel when a signal power value of a reception signal received by the reception unit, as measured by the power measurement unit, exceeds a power threshold.

6. The wireless communication apparatus according to claim 5, wherein the interference detection unit is configured to determine that interference on the wireless communication channel is not detected when the signal power value, as measured by the power measurement unit, falls below a second power threshold which is lower than the power threshold.

7. The wireless communication apparatus according to claim 1, further comprising:
    a smoothing unit that smooths signal power values output from the power measurement unit, wherein
    the interference detection unit performs the detection of interference on each wireless communication channel based on signal power values smoothed by the smoothing unit.

8. The wireless communication apparatus according to claim 1, wherein
    the control unit controls the reception unit such that reception is intermittently performed regardless of interference detected by the interference detection unit.

9. The wireless communication apparatus according to claim 1, wherein
    the wireless communication apparatus operates according to a Bluetooth low energy (BLE) specification, and the communication control signal is an advertisement signal according to the Bluetooth low energy specification.

10. The wireless communication apparatus according to claim 1, wherein
the wireless communication apparatus operates according to a Bluetooth low energy (BLE) specification, and
the communication control signal is a beacon signal that includes unique identification information.

11. The wireless communication apparatus according to claim 1, wherein
the interference detection unit is configured to determine that interference occurs in each wireless communication channel in the plurality of wireless communication channels when a signal power value of a wireless signal on the respective wireless communication channel, as measured by the power measurement unit, exceeds a first predetermined power threshold and the signal detection unit does not detect an identification signal in the wireless signal on the respective wireless communication channel.

12. The wireless communication apparatus according to claim 11, wherein the interference detection unit is further configured to determine that interference is not detected on the wireless communication channel if the signal power value for the respective wireless signal, as measured by the power measurement unit, is lower than a second predetermined power threshold that is lower than the first predetermined power threshold.

13. A wireless communication apparatus, comprising:
a transmission unit configured to transmit a communication control signal on each wireless communication channel in a plurality of wireless communication channels;
an interference detection unit configured to detect interference on each wireless communication channel in the plurality of the wireless communication channels;
a reception unit configured to receive wireless signals on each wireless communication channel in the plurality of wireless communication channels;
a power measurement unit configured to measure signal power values of the wireless signals received by the reception unit; and
a control unit configured to control the transmission unit to stop transmitting the communication control signal on any wireless communication channel in the plurality of wireless communication channels on which interference is detected by the interference detection unit, wherein
the interference detection unit detects interference according to signal power values measured by the power measurement unit,
the interference detection unit includes a counter for every wireless communication channel through which the communication control signal is transmitted,
the interference detection unit is configured to cause a counter for a wireless communication channel to increase a count value when a signal power value of a reception signal for a wireless communication channel exceeds a first power threshold, and cause the counter to decrease the count value when the signal power value falls below the first power threshold, and
the interference detection unit is configured to determine that interference is occurring on the wireless communication channel when the counter value of the counter exceeds a first count threshold, and that interference is no longer occurring when the counter value of the counter falls below a second count threshold which is lower than the first count threshold.

14. The wireless communication apparatus according to claim 13, wherein the interference detection unit resets the counter when interference is not detected.

15. The wireless communication apparatus according to claim 13, further comprising:
a signal detection unit configured to detect an identification signal in wireless signals received by a reception unit, wherein
the interference detection unit does not perform detection of interference when the signal detection unit detects the identification signal.

16. The wireless communication apparatus according to claim 15, wherein the interference detection unit is configured to detect interference at a same timing as which the reception unit receives responses to the communication control signal.

* * * * *